F. H. Jones,
Eye Shade.
N° 18,015. Patented Aug. 18, 1857.
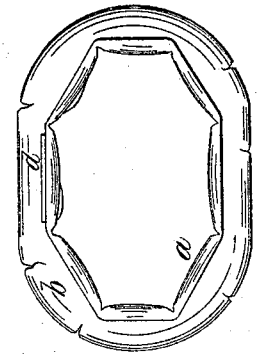
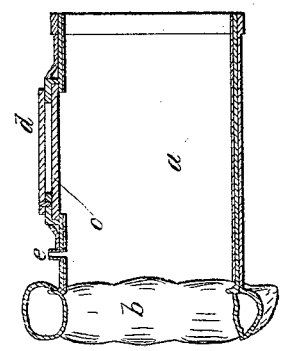
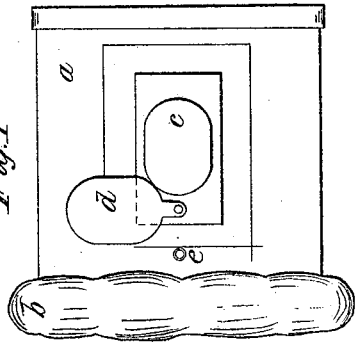
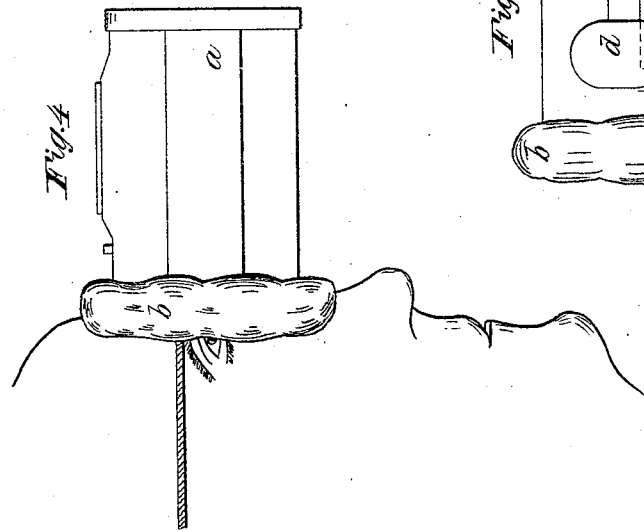

UNITED STATES PATENT OFFICE.

FRANCIS H. JONES, OF FEDERALSBURG, MARYLAND.

EYE-SHADING APPARATUS.

Specification of Letters Patent No. 18,015, dated August 18, 1857.

*To all whom it may concern:*

Be it known that I, F. H. JONES, of Federalsburg, in the county of Dorchester and State of Maryland, have invented a new and useful Improvement in Eye-Shading Apparatus; and I do hereby declare that the following is a full, clear, and exact description of the construction and operation of the same, reference being had to the annexed drawing, forming part of this specification, in which—

Figure 1 is a top view of the apparatus. Fig. 2 is an end view of same. Fig. 3 is a sectional view of same. Fig. 4 is a side view showing the application of apparatus.

Similar letters of reference in the several figures denote the same part.

This apparatus is designed for the use of students, and consists of a metallic tube $a$, covered with silk or any suitable material, and terminating with a pad $b$ at the extremity in contact with the wearer. In the top of the tube is a plate of green glass $c$, and above this plate is a movable cover $d$. There is a small tube $e$ in the top of the tube for the escape of heated air.

This apparatus is applied before the eyes of the wearer as is shown in Fig. 4. The tube $e$ serves to discharge the heated air from the tube, and the window in the top of the tube admits of any desired amount of light being admitted within the tube, the swinging cover $d$ graduating this quantity. This graduation of the light admitted to the tube is designed as an adjustment of the tube to suit the illumination of the apartment in which it is used. If there be an excess of light in the room, the wearer will close the cover. If there be but a small degree of illumination, then there will not exist the necessity for the eyes of the wearer to be as deeply shaded, and the cover $d$ is then removed the requisite distance, thus graduating the amount of shade to the degree of illumination in which the wearer is placed. I use colored glass for the window $c$, since it is more agreeable to the eyes, but this is not essential.

I am aware of the use of tubes in picture galleries, and also of the employment of shades above the eyes; such therefore I disclaim.

What I do claim as new and of my own invention, is—

The arrangement in the top of the tube of the ventilator $e$ and light graduating contrivance $c$ $d$, when the tube is designed for use as herein stated.

In testimony whereof, I have hereunto signed my name before two subscribing witnesses.

FRANCIS H. JONES.

Witnesses:
GEO. PATTEN,
JOHN S. HOLLINGSHEAD.